(12) United States Patent
Desai et al.

(10) Patent No.: US 10,713,087 B2
(45) Date of Patent: *Jul. 14, 2020

(54) MANAGEMENT OF UNMANAGED USER ACCOUNTS AND TASKS IN A MULTI-ACCOUNT MOBILE APPLICATION

(71) Applicant: Citrix Systems, Inc., Fort Lauderdale, FL (US)

(72) Inventors: Nitin Desai, Coral Springs, FL (US); Zhongmin Lang, Parkland, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 369 days.

This patent is subject to a terminal disclaimer.

(21) Appl. No.: 15/357,363

(22) Filed: Nov. 21, 2016

(65) Prior Publication Data

US 2017/0068568 A1  Mar. 9, 2017

Related U.S. Application Data

(63) Continuation of application No. 14/151,972, filed on Jan. 10, 2014, now Pat. No. 9,501,315.

(51) Int. Cl.
| | |
|---|---|
| *G06F 9/46* | (2006.01) |
| *H04L 29/08* | (2006.01) |
| *G06F 9/48* | (2006.01) |
| *G06F 21/60* | (2013.01) |

(Continued)

(52) U.S. Cl.
CPC ............ *G06F 9/468* (2013.01); *H04L 67/306* (2013.01); *G06F 9/48* (2013.01); *G06F 21/60* (2013.01); *H04L 63/20* (2013.01); *H04L 67/10* (2013.01); *H04L 67/141* (2013.01); *H04L 67/20* (2013.01); *H04W 12/08* (2013.01)

(58) Field of Classification Search
None
See application file for complete search history.

(56) References Cited

U.S. PATENT DOCUMENTS

| | | |
|---|---|---|
| 8,495,731 B1 | 7/2013 | Mar et al. |
| 8,613,070 B1 | 12/2013 | Borzycki et al. |
| 8,650,303 B1 | 2/2014 | Lang et al. |

(Continued)

OTHER PUBLICATIONS

Jan. 14, 2016—(US) Non-Final Office Action—U.S. Appl. No. 14/151,972.

(Continued)

*Primary Examiner* — Benjamin C Wu
(74) *Attorney, Agent, or Firm* — Banner & Witcoff, Ltd.

(57) ABSTRACT

Methods, systems, computer-readable media, and apparatuses for providing mobile application management (MAM) functionalities are presented. In some embodiments, a mobile device may initialize a partially managed application associated with a first managed user account and an unmanaged user account. The mobile device may execute first managed tasks associated with the first managed user account in accordance with a first set of MAM policies provided by a first MAM service provider. The mobile device may execute unmanaged tasks associated with the unmanaged account independent of the first set of MAM policies. In some embodiments, the mobile device may initialize the multi-account managed application associated with a second managed user account.

20 Claims, 11 Drawing Sheets

(51) Int. Cl.
*H04L 29/06* (2006.01)
*H04W 12/08* (2009.01)

(56) References Cited

U.S. PATENT DOCUMENTS

| | | | |
|---|---|---|---|
| 8,850,050 B1* | 9/2014 | Qureshi | H04L 41/0816 709/229 |
| 8,904,477 B2 | 12/2014 | Barton et al. | |
| 8,959,579 B2 | 2/2015 | Barton et al. | |
| 9,043,480 B2 | 5/2015 | Barton et al. | |
| 9,111,105 B2 | 8/2015 | Barton et al. | |
| 9,213,850 B2 | 12/2015 | Barton et al. | |
| 9,280,377 B2 | 3/2016 | Lang et al. | |
| 9,749,331 B1* | 8/2017 | Koeten | H04L 67/10 |
| 2009/0228807 A1* | 9/2009 | Lemay | G06F 3/04817 715/752 |
| 2012/0311057 A1* | 12/2012 | Wang | G06Q 10/107 709/206 |
| 2012/0311659 A1 | 12/2012 | Narain et al. | |
| 2013/0074142 A1 | 3/2013 | Brennan et al. | |
| 2013/0091543 A1 | 4/2013 | Wade et al. | |
| 2013/0173455 A1 | 7/2013 | Adams et al. | |
| 2013/0238906 A1* | 9/2013 | Khoury | G06F 21/6218 713/193 |
| 2013/0297700 A1 | 11/2013 | Hayton et al. | |
| 2013/0298185 A1 | 11/2013 | Koneru et al. | |
| 2013/0298201 A1 | 11/2013 | Aravindakshan et al. | |
| 2014/0040979 A1 | 2/2014 | Barton et al. | |
| 2014/0059642 A1 | 2/2014 | Deasy et al. | |
| 2014/0113613 A1* | 4/2014 | Huang | H04W 4/02 455/418 |
| 2014/0115646 A1 | 4/2014 | Rajgopal et al. | |
| 2015/0143362 A1 | 5/2015 | Lukacs et al. | |
| 2015/0200921 A1 | 7/2015 | Linga et al. | |

OTHER PUBLICATIONS

Jul. 20, 2016—(US) Notice of Allowance—U.S. Appl. No. 14/151,972.
Jun. 25, 2018—(EP) Office Action—App 14703957.2.

* cited by examiner

US 10,713,087 B2

MANAGEMENT OF UNMANAGED USER ACCOUNTS AND TASKS IN A MULTI-ACCOUNT MOBILE APPLICATION

CROSS-REFERENCE TO RELATED APPLICATIONS

This application is a continuation of and claims priority to U.S. Non-Provisional patent application Ser. No. 14/151,972, filed Jan. 10, 2014, entitled "MANAGEMENT OF UNMANAGED USER ACCOUNTS AND TASKS IN A MULTI-ACCOUNT MOBILE APPLICATION". The above-mentioned patent application is incorporated by reference herein in its entirety.

BACKGROUND

Aspects of the disclosure relate to computer hardware and software. In particular, one or more aspects of the disclosure generally relate to computer hardware and software for providing mobile device management functionalities.

Increasingly, corporations and other organizations are providing and/or otherwise enabling their employees and other associates with mobile devices, such as smart phones, tablet computers, and other mobile computing devices. As these devices continue to grow in popularity and provide an increasing number of functions, many organizations may wish to place certain controls on how these devices can be used, what resources these devices can access, and how the applications running on these devices can interact with other resources. For example, many organizations may wish to place certain controls on one or more applications present on these devices to control how the user can interact with those applications.

SUMMARY

Various aspects of the disclosure provide efficient, effective, functional, and convenient ways of controlling how mobile devices can be used, what resources mobile devices can access, and how the applications and other software running on these devices can interact with other resources. In particular, in one or more embodiments discussed in greater detail below, mobile application management functionalities are deployed, implemented, and/or used in a number of different ways to provide one or more of these and/or other advantages.

Using some conventional systems, enterprise organizations may be able to manage an application in its entirety or not at all. In one or more embodiments discussed in greater detail below, techniques for selectively managing various aspects of applications are provided.

In some embodiments, a mobile device may initialize a partially managed application associated with a first managed user account and an unmanaged user account. The mobile device may execute one or more first managed tasks associated with the first managed user account in accordance with a first set of mobile application management (MAM) policies provided by a first MAM service provider. In addition, the mobile device may execute one or more unmanaged tasks associated with the unmanaged user account independent of the first set of MAM policies provided by the first MAM service provider. The mobile device may concurrently execute the one or more first managed tasks and the one or more unmanaged tasks.

In some embodiments, a mobile device may initialize a multi-account managed application associated with a first managed user account and a second managed user account different from the first managed user account. The mobile device may execute one or more first managed tasks associated with the first managed user account in accordance with a first set of mobile application management (MAM) policies provided by a first MAM service provider and independent of a second set of MAM policies provided by a second MAM service provider. The second set of MAM policies may be different from the first set of MAM policies and the second MAM service provider may be different from the first MAM service provider. The mobile device may execute one or more second managed tasks associated with the second managed user account in accordance with the second set of MAM policies provided by the second MAM service provider and independent of the first set of MAM policies provided by the first MAM service provider. The mobile device may concurrently execute the one or more first managed tasks and the one or more second managed tasks.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling remote access to resources at an enterprise computing system using managed mobile applications at mobile computing devices. An access manager may perform a validation process that determines whether a mobile application requesting access to enterprise resources has accurately identified itself and has not been subsequently altered after installation at the mobile computing device. In this way, the access manager may ensure the mobile application requesting access to the enterprise resource can be trusted and is not attempting to circumvent the security mechanisms used to protect those enterprise resources. As a result, individuals associated with the enterprise may advantageously utilize enterprise resources at their personal mobile devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
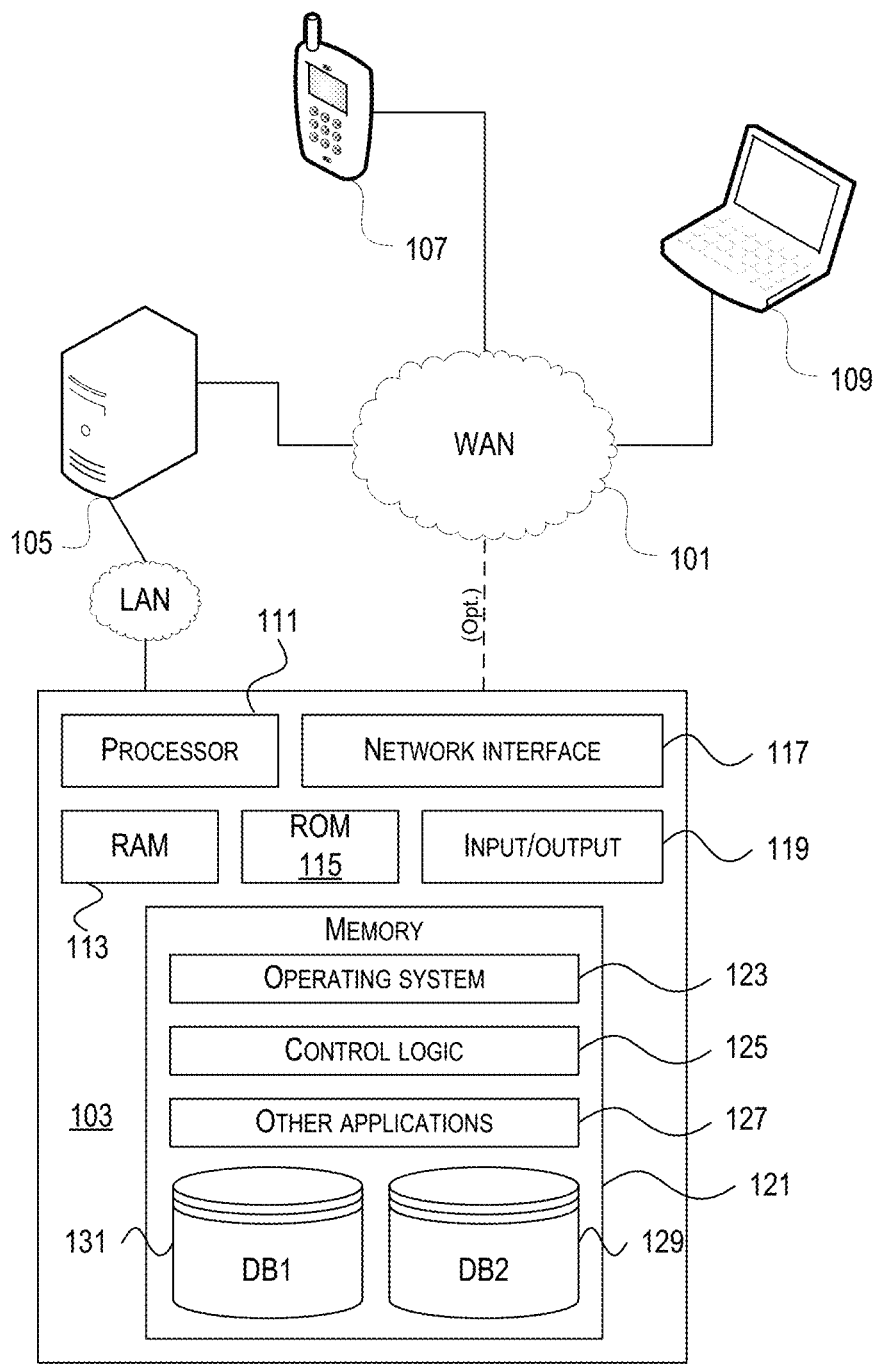
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LANs), metropolitan area networks (MAN), wireless networks, personal networks (PAN), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
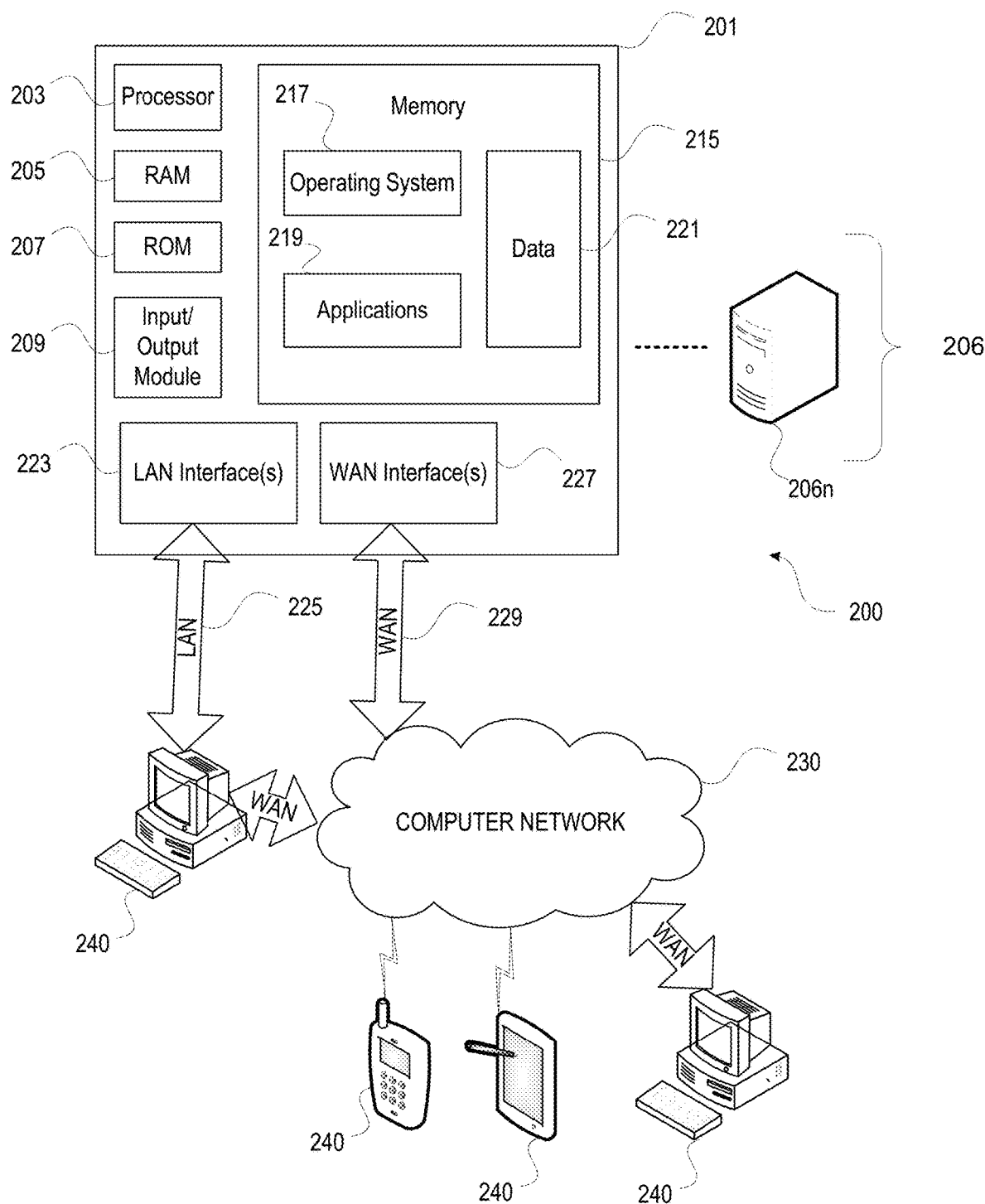
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine client agent program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
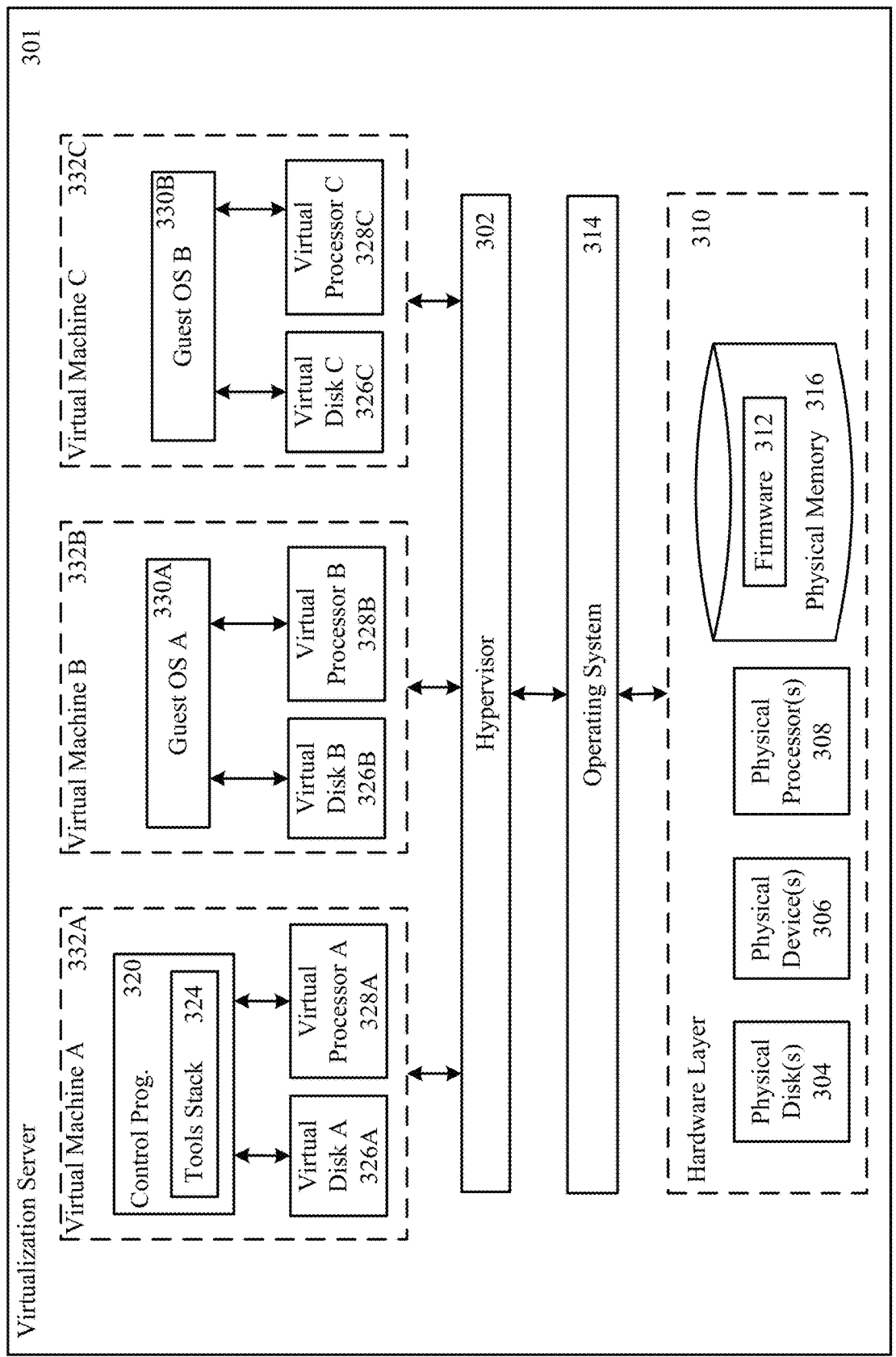
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (Not Shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
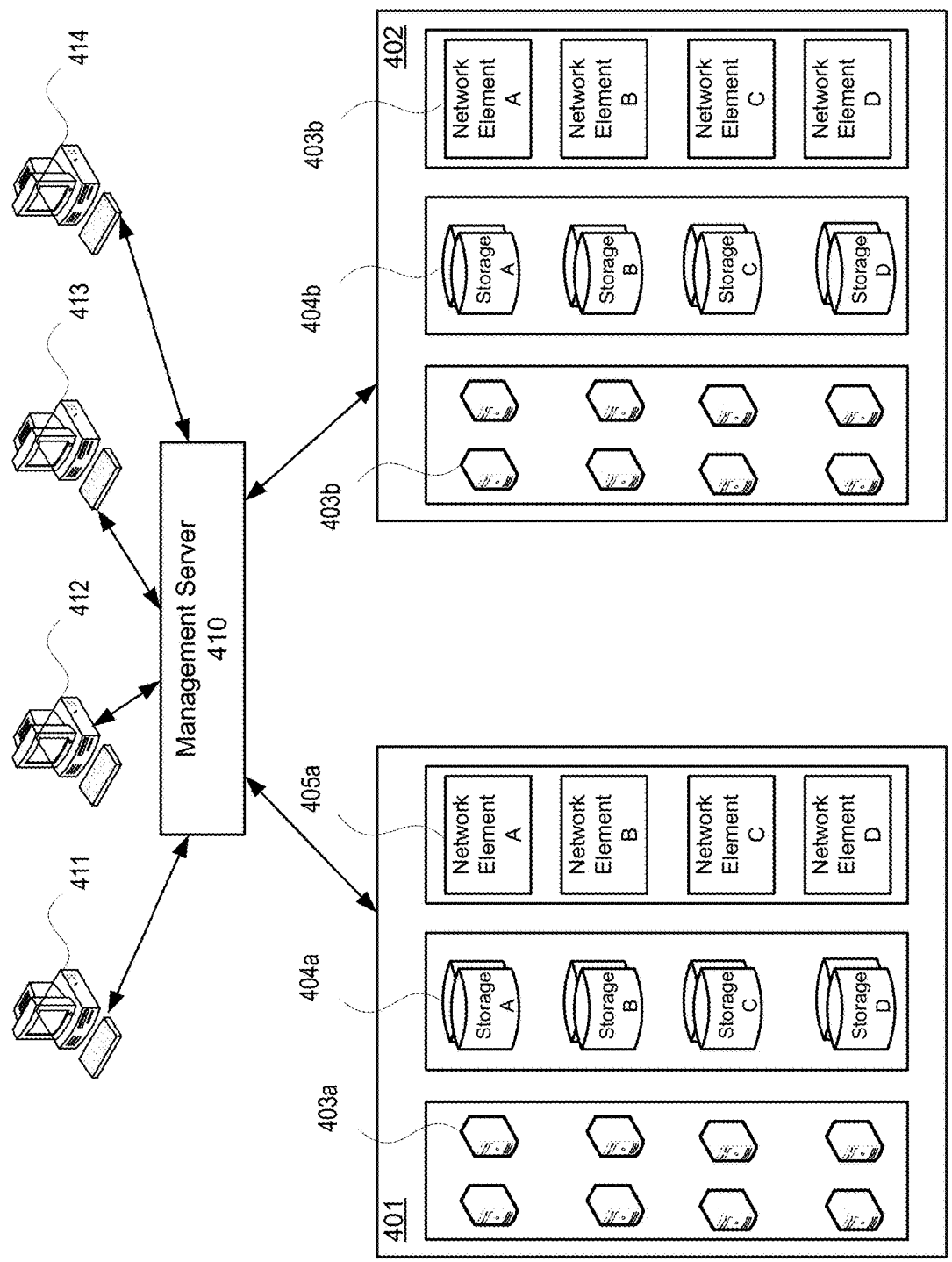
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
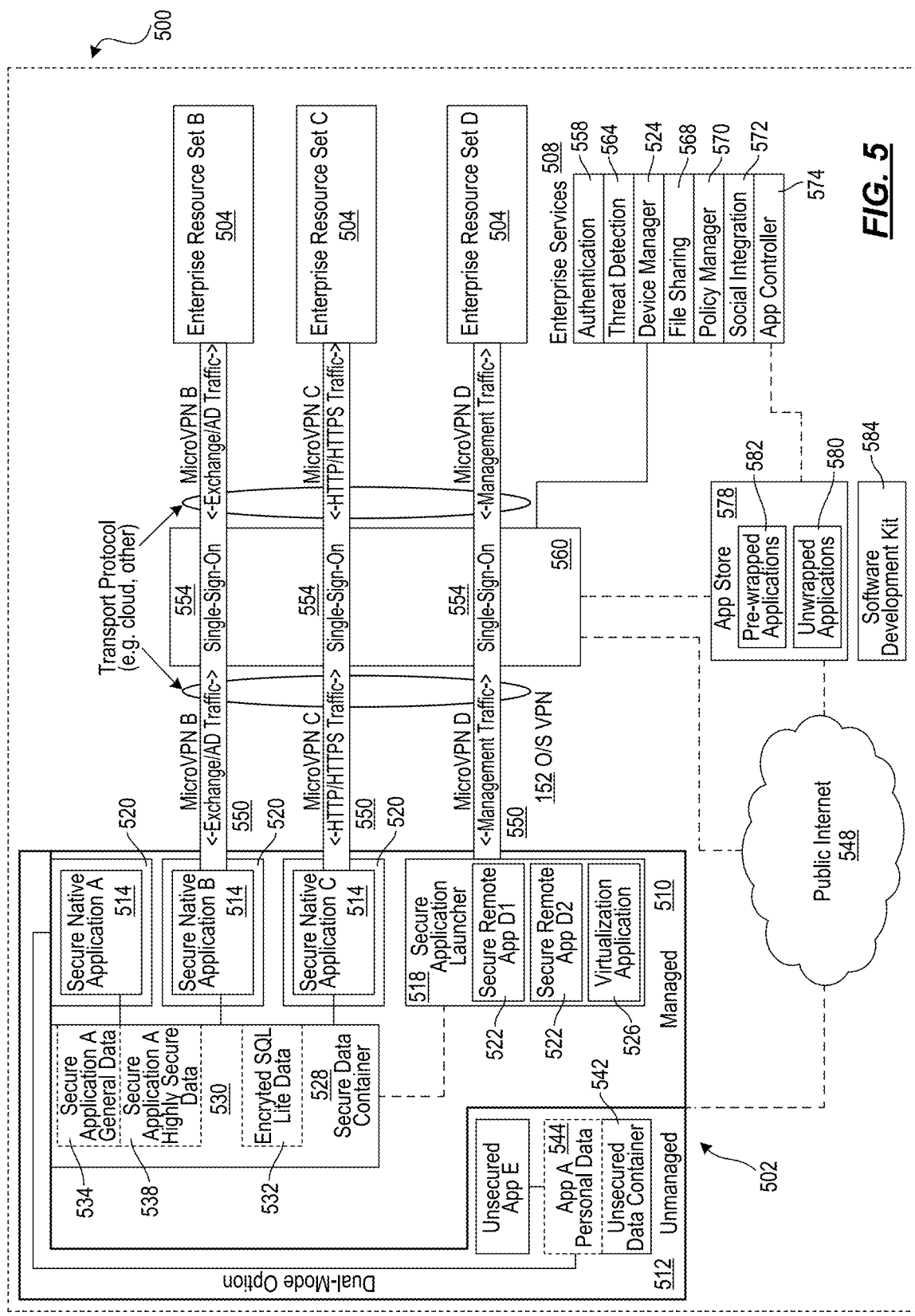
FIG. 5 depicts an illustrative enterprise mobility management system.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device may run an iOS operating system, Android operating system, and/or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device or a managed device.

In some embodiments, the operating system of the mobile device may be separated into a managed partition 510 and an unmanaged partition 512. The managed partition 510 may have policies applied to it to secure the applications running on and data stored in the managed partition. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The applications running on the managed partition may be secure applications. The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like.

The secure applications may access data stored in a secure data container 528 in the managed partition 510 of the mobile device. The data secured in the secure data container may be accessed by the secure wrapped applications 514, applications executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as AES 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured mode. In an unsecured mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections (also referred to at microVPN or application-specific VPN) may be specific to particular applications 550, particular devices, particular secured areas on the mobile device, and the like (e.g., 552). For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use user interface. The application store 578 may provide access to a software development kit 584. The software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
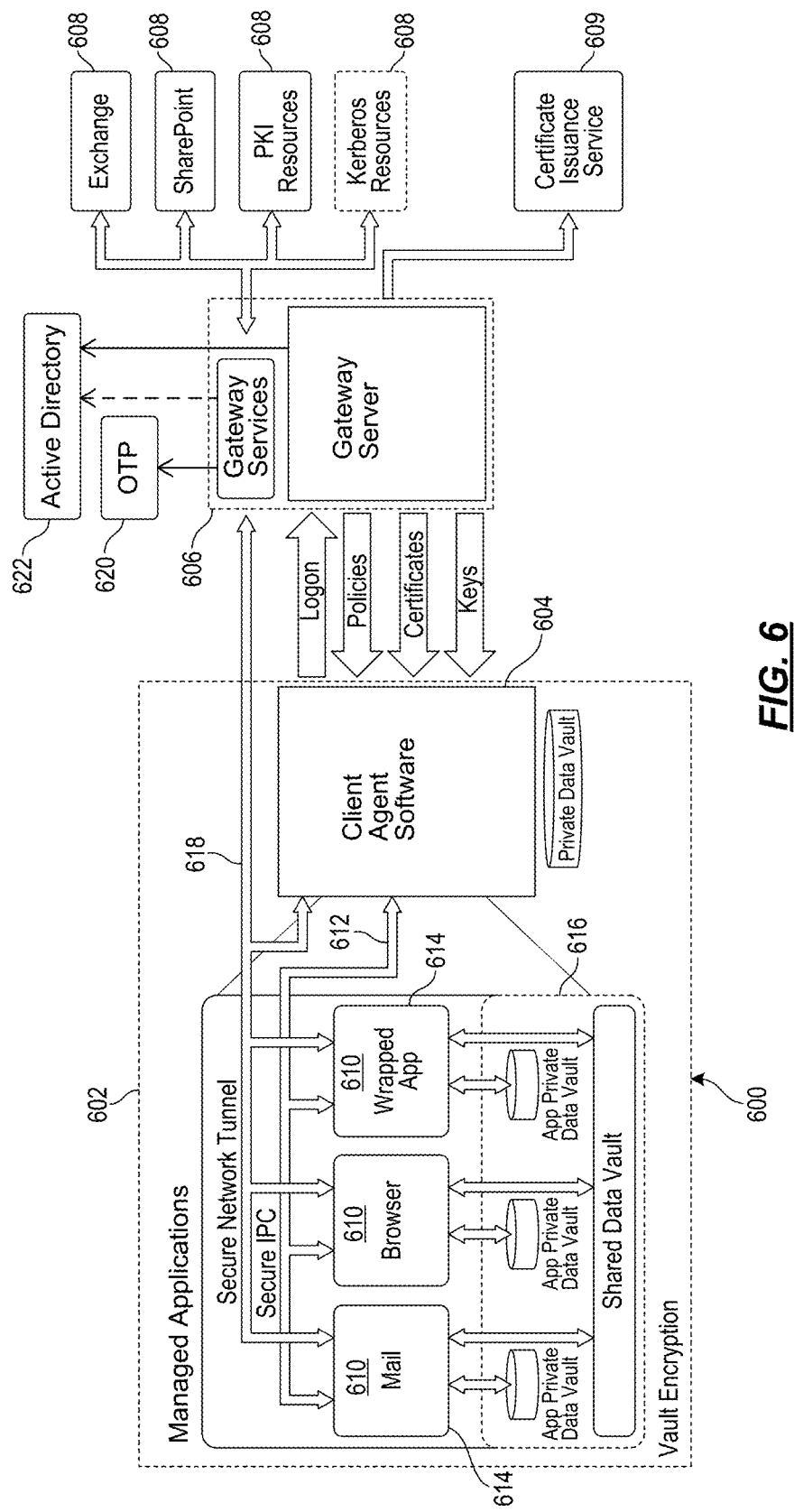
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled/managed mobile device 602 with a client agent 604, which interacts with gateway server 606 (which includes access gateway and application controller functionality) to access various enterprise resources 608 and services 609 such as Exchange, Sharepoint, PKI Resources, Kerberos Resources, and Certificate Issuance Service, as shown on the right hand side above. Although not specifically shown, the mobile device 602 may also interact with an application store for the selection and downloading of applications.

The client agent 604 acts as the UI (user interface) intermediary for Windows apps/desktops hosted in an Enterprise data center, which are accessed using a display remoting protocol, such as but not limited to the ICA protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and the application management framework (AMF) of this architecture act to provide policy driven management capabilities and features such as connectivity and SSO (single sign on) to enterprise resources/services 608. The client agent 604 handles primary user authentication to the enterprise, normally to the access gateway (AG) with SSO to other gateway server components. The client agent 604 obtains policies from gateway server 606 to control the behavior of the AMF managed applications 610 on the mobile device 602.

The secure IPC links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through access gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The mail and browser managed applications 610 have special status and may make use of facilities that might not be generally available to arbitrary wrapped applications. For example, the mail application may use a special background network access mechanism that allows it to access Exchange over an extended period of time without requiring a full AD logon. The browser application may use multiple private data vaults to segregate different kinds of data.

This architecture supports the incorporation of various other security features. For example, gateway server 606 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password. When data is stored locally on the device 602 in the secure container 616, it is preferred that a minimum of AES 256-bit encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want the enterprise application store to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via a micro VPN feature). For example, an email application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the mail and browser managed applications, and ultimately by arbitrary wrapped applications (provided those applications use web service style communication patterns where it is reasonable for the application management framework to mediate HTTPS requests).

Client certificate support on iOS may rely on importing a PKCS 12 BLOB (Binary Large Object) into the iOS keychain in each managed application for each period of use. Client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to AD 622, using an AD password or trusted client certificate, and obtain Kerberos service tickets to respond to HTTP negotiate authentication challenges. The limited support feature relates to constrained delegation in AGEE, where AFEE supports invoking Kerberos protocol transition so it can obtain and use Kerberos service tickets (subject to constrained delegation) in response to HTTP negotiate authentication challenges. This mechanism works in reverse web proxy (a.k.a. CVPN) mode, and when HTTP (but not HTTPS) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of the enterprise application store and application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Mobile Application Management Features

Having discussed several examples of the computing architecture and the enterprise mobility management architecture that may be used in providing and/or implementing various aspects of the disclosure, a number of embodiments will now be discussed in greater detail. In particular, and as introduced above, some aspects of the disclosure generally relate to providing mobile application management functionalities. In the description below, various examples illustrating how mobile application management functionalities may be provided in accordance with one or more embodiments will be discussed.

Figure 7:
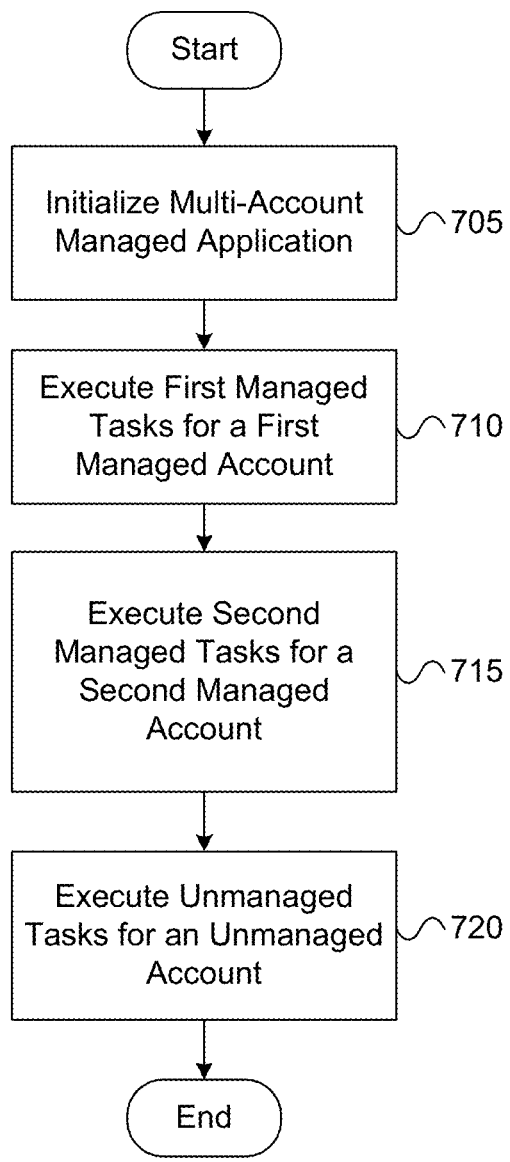
FIG. 7 depicts a flowchart that illustrates a method of initializing a multi-account managed application and selectively enforcing management policies to accounts of the multi-account managed application in accordance with one or more illustrative aspects discussed herein.

FIG. 7 depicts a flowchart that illustrates a method of initializing a multi-account managed application and selectively enforcing mobile application management (MAM) policies to user accounts of the multi-account managed application in accordance with one or more illustrative aspects discussed herein. In one or more embodiments, the method of FIG. 7 and/or one or more steps thereof may be performed by a computing device (e.g., generic computing device 201). In other embodiments, the method illustrated in FIG. 7 and/or one or more steps thereof may be embodied in computer-executable instructions that are stored in a computer-readable medium, such as a non-transitory computer-readable memory.

As seen in FIG. 7, the method may begin at step 705 in which a mobile device may initialize a multi-account managed application. For example, in step 705, a mobile device may initialize the multi-account managed application by initializing one or more of a first managed user account and a second managed user account for the same user. In some instances, the mobile device may initialize an unmanaged user account for the same user. In such instances, the multi-account managed application may be referred to as a partially managed application.

In some embodiments, in an application where a user has three user accounts (e.g., two managed user accounts and one unmanaged user account), the mobile device may initiate a request for enrollment with one or more mobile application management service providers (e.g., a first MAM service provider and a second MAM service provider). The request may include an indication of which user account the user wishes to be subject to policies set by the MAM service providers. Each MAM service provider may determine whether to grant enrollment and may, in turn, send MAM policies in, for example, a policy-enforcement profile or certificate to the mobile device. The policy enforcement profile may be specific to a particular user account of the application and configured to facilitate enforcement of policies on the particular user account. For example, the mobile device may enroll a first user account of the application with a first MAM service provider so that the first user account is subject a first set of MAM policies provided by the first MAM service provider. Such a first user account may now be referred to as a first managed user account of a multi-account managed application and/or a partially managed application. Similarly, the mobile device may enroll a second user account of the application with a second MAM service provider so that the second user account is subject to a second set of MAM policies provided by the second MAM service provider. Such a second user account may be referred to as a second managed user account of the multi-account managed application and/or the partially managed application. The mobile device may determine not to request enrollment with a MAM service provider for a third user account. Thus, the third user account might not be subject to any set of MAM policies. Such a user account may be referred to as an unmanaged user account of the partially managed application. As a result, the mobile device may concurrently manage the first managed user account in accordance with the first set of MAM policies and the second managed user account in accordance with the second set of MAM policies while refraining from managing the unmanaged user account (e.g., by not subjecting the unmanaged user account to the first set of MAM policies and/or the second set of MAM policies). In some embodiments, the user accounts may specific to a role or position of a corporation rather than specific to the user. In some embodiments, the first and second MAM service providers may be the same MAM service provider. In some embodiments, the first and second MAM service providers may be different MAM service providers.

In some embodiments, the application may be wrapped in a secure application wrapper (e.g., by an application store, by one or more enterprise services, and/or by the mobile device itself) such that the application is now a multi-managed application and/or a partially managed application. The secure application wrapper running on the mobile device may enforce policies for each MAM service provider on a respective managed user account. For example, the mobile device may enforce, via the secure application wrapper, the first set of MAM policies on the first managed user account and the second set of MAM policies on the second managed user account. Particularly, the secure application wrapper may obtain and monitor state information of the multi-managed application (e.g., the partially managed application) and/or the mobile device. The state information may include, for example, which user account is currently in focus, which user is currently logged into the mobile device or the application, what tasks are currently being executed, whether the task is being executed in a foreground context or a background context of the mobile device, the geographic location of the mobile device, whether the mobile device is within a geofence of the MAM service provider, whether the mobile device has established a network connection with the MAM service provider, and/or any other information.

In some embodiments, the secure application wrapper running on the mobile device may determine what policies to enforce on a given task associated with a user account. Specifically, the secure application wrapper may enforce the first set of MAM policies based on the monitored state information of the partially managed application (e.g., based on which user account is currently in focus) and/or the mobile device. Similarly, the secure application wrapper may enforce the second set of MAM policies based on the monitored state information of the mobile device. The secure application wrapper may detect a change in state information of the partially managed application and/or the mobile device. For example, the secure application wrapper may detect that the first managed user account is currently in focus. In response, the secure application wrapper may apply the first set of MAM policies on any first managed task executed by the mobile device in association with the first managed user account. In some embodiments, the secure application wrapper may send the change in state information and/or other state information to the first MAM service provider for remote processing and, in return, may receive processed state information of the partially managed application and/or the mobile device. The mobile device, via the secure application wrapper, may then enforce the first set of MAM policies in conjunction with the processed state information. In some embodiments, the mobile device may wrap the application with a second secure application wrapper to enforce the second set of MAM policies.

In step 710, the mobile device may execute one or more first managed tasks associated with the first managed user account in accordance with the first set of MAM policies provided by the first MAM service provider. For example, in step 710, the mobile device (and/or the secure application wrapper running on the mobile device) may apply some policies (e.g., rules) that may result in behavior limitations and/or behavior enhancements associated with the first managed user account. Particularly, the first set of MAM policies may be applied to the first managed tasks. The first managed tasks may include one or more tasks configured to be executed in a foreground context and one or more tasks executed in a background context of the multi-account managed application. The first managed tasks may be any operation performed in relation to or on behalf of the first managed user account of the user. For example, one or more of the first managed tasks may include performing an operation on first managed user account data (e.g., a cut and paste operation, a text-editing or other content-editing operation, etc.), sending and/or receiving a communication to another device or software engine local to the mobile device, accessing resources associated with the first managed user account (e.g., first managed user account data), and/or otherwise processing the first managed user account data, one or more commands, and/or any other tasks.

The mobile device may execute the one or more first managed tasks independent of the second set of MAM policies provided by the second MAM service provider. In particular, the mobile device may execute the first managed tasks regardless of the policies provided by the second MAM service provider and/or other MAM service providers (which may, e.g., include executing the first managed tasks in accordance with the first set of MAM policies without subjecting such tasks to the policies provided by the second MAM service provider or any other MAM service providers, even if the mobile device is concurrently executing and/or otherwise executing one or more other tasks that are subject to the second set of MAM policies). In other words, the second set of MAM policies and/or other MAM policies might have no effect (e.g. a nullity) on the one or more first managed tasks. In some embodiments, even if one or more of the second set of policies are directed to managing the first managed user account and/or otherwise conflict with the first managed tasks, the secure application wrapper and/or the mobile device may ignore and/or otherwise not enforce these policies with respect to the first managed user account. As a result, the mobile device may execute the first managed tasks despite the second set of MAM policies. In an exemplary embodiment, the mobile device may execute the one or more first managed tasks in the background even if the user context switches (e.g., from the first managed user account to the second managed user account) such that the mobile device executes one or more second managed tasks in accordance with the second set of MAM policies.

In step 715, the mobile device may execute one or more second managed tasks associated with the second managed user account in accordance with the second set of MAM policies provided by the second MAM service provider. For example, in step 715, the mobile device (and/or the secure application wrapper running on the mobile device) may apply policies (e.g., rules) that may result in behavior limitations and/or behavior enhancements associated with the second managed user account. Particularly, the second set of MAM policies may be applied to the second managed tasks. The second managed tasks may include one or more tasks configured to be executed in a foreground context and one or more tasks configured to be executed in a background context of the multi-account managed application. The second managed tasks may be any operation performed in relation to or on behalf of the second managed user account of the user. For example, one or more of the second managed tasks may include performing an operation on second managed user account data (e.g., a cut and paste operation, a text-editing or other content-editing operation, etc.), sending and/or receiving a communication to another device or software engine local to the mobile device, accessing resources associated with the second managed user account (e.g., second managed user account data), and/or otherwise processing of the second managed user account data, one or more commands, and/or any other tasks.

The mobile device may execute the one or more second managed tasks independent of the first set of MAM policies provided by the first MAM service provider. In particular, the mobile device may execute the second managed tasks regardless of the policies provided by the first MAM service provider and/or other MAM service providers (which may, e.g., include executing the second managed tasks in accordance with the second set of MAM policies without subjecting such tasks to the policies provided by the first MAM service provider or any other MAM service providers, even if the mobile device is concurrently executing and/or otherwise executing one or more other tasks that are subject to the first set of MAM policies). In other words, the first set of MAM policies and/or other MAM policies have no effect (e.g. a nullity) on the one or more second managed tasks. In some embodiments, even if one or more of the first set of policies are directed to managing the second managed user account and/or otherwise conflict with the second managed tasks, the secure application wrapper and/or the mobile device may ignore and/or otherwise not enforce these policies with respect to the second managed user account. As a result, the mobile device may execute the second managed tasks despite the first set of MAM policies. In an exemplary embodiment, the mobile device may execute the one or more second managed tasks in the background even if the user context switches (e.g., from the second managed user account to the first managed user account) such that the mobile device executes one or more of the first managed tasks in accordance with the first set of MAM policies.

In some embodiments, the second managed user account may be different from the first managed user account. The second set of MAM policies may be different from the first set of MAM policies and the second MAM service provider may be different from the first MAM service provider. The one or more second managed tasks may be different from the one or more first managed tasks. For example, the first managed user account may be used by a user when he/she is at one worksite for one organization, while the second managed user account may be used by the same user when he/she is at a different worksite for a different organization. In an exemplary embodiment, a doctor may have an application on his mobile device. The application may be associated with two managed accounts of the doctor, one account for a first hospital and a different account for a second hospital. When the doctor is at the first hospital, the mobile device may permit the doctor to interact with the account for the first hospital and may concurrently execute tasks of the account for the second hospital in the background. Similarly, when the doctor is at the second hospital, the mobile device may permit the doctor to interact with the account for the second hospital and may concurrently execute tasks of the account for the first hospital in the background.

In step 720, the mobile device may execute one or more unmanaged tasks associated with the unmanaged user account (e.g., a personal account) independent of the MAM policies. For example, in step 720, the mobile device may execute one or more unmanaged tasks associated with the unmanaged user account independent of the first set of MAM policies provided by the first MAM service provider and independent of the second set of MAM policies provided by the second MAM service provider. Particularly, the mobile device may execute the one or more unmanaged tasks regardless of the first set of policies provided by the first MAM service provider, the second set of policies provided by the second MAM service provider, and/or other MAM service providers (which may e.g., include executing the unmanaged tasks without subjecting such tasks to the policies of the first MAM service provider, the policies of the of the second MAM service provider or any other MAM service providers, even if the mobile device is concurrently executing and/or otherwise executing one or more other tasks that are subject to either the first set of MAM policies, the second set of MAM policies or any other MAM policies). In other words, the MAM policies may have no effect (e.g. a nullity) on the one or more unmanaged tasks. In some embodiments, even if one or more of the MAM policies are directed to managing the unmanaged user account and/or otherwise conflict with the one or more unmanaged tasks, the secure application wrapper and/or the mobile device may ignore and/or otherwise not enforce these policies with respect to the unmanaged user account. As a result, the mobile device may execute the unmanaged tasks despite any MAM policies. In an exemplary embodiment, the mobile device may execute the one or more unmanaged tasks in the background even if the user context switches (e.g., from the unmanaged user account to one of the first managed user account and the second managed user account) such that the mobile device executes one or more of the first managed tasks and/or one or more of the second managed tasks in accordance with the respective set of MAM policies.

In some embodiments, in executing the first managed tasks in accordance with the first set of MAM policies in step 710, the first set of MAM policies may include one or more MAM policies set by the first MAM service provider (e.g., an organization the user works with). Similarly, in executing the second managed tasks in accordance with the second set of MAM policies set by the second MAM service provider (e.g., another different organization the user works with). The MAM policies included in one or more of the first set of MAM policies and the second set of MAM policies to be applied respectively to the first managed tasks and the second managed tasks may include, for example, various enforcement MAM policies. For example, a MAM policy may selectively enable and disable functionality within the multi-account managed application. Particularly, the first MAM policy may prevent acknowledgement and/or implementation of: one or more user input actions supported by the multi-account managed application, one or more processing/analyzing actions supported by the multi-account managed application, and/or one or more output actions supported by the multi-account managed application.

In some embodiments, for example, a MAM policy may prevent implementation of one or more user input actions received by the mobile device. A policy may prevent the mobile device from modifying settings of a managed account, modifying displayed managed account information (e.g., read-only) of the managed account, or the like. For example, the MAM policy may be a cut, copy, and/or paste restriction that prevents the mobile device from cutting or copying the first managed user account data and/or pasting such first managed user account data.

In some embodiments, for example, a MAM policy may cause the mobile device to prevent processing and/or analyzing actions and/or initiate actions. For example, the mobile device may disable functionality associated with the prevented inputs described above and/or may prevent specific background processing in certain circumstances. For example, a MAM policy may be a selective wipe policy that when enforced by the mobile device may delete and/or otherwise remove managed account data from the mobile device. In some instances, the mobile device may send such managed account data to the MAM service provider. In such instances, the mobile device may maintain and not delete any data outside of the managed account data (e.g., other managed account data associated with the another managed account, unmanaged user account data associated with the unmanaged user account, personal data, and/or other data).

In some embodiments, for example, a MAM policy may cause the mobile device to prevent implementation of one or more output actions by the mobile device such as displaying one or more items of information and/or communicating to one or more devices. For example, a MAM policy may prevent the mobile device from displaying information outside of the managed account information when the managed user account is currently in focus. For example, a MAM policy of the first set of MAM policies may prevent the mobile device from displaying second managed user account information associated with the second managed user account and/or unmanaged user account information associated with the unmanaged user account when the first managed user account is currently in focus. For example, a MAM policy may prevent the mobile device from displaying information of other applications. For example, the policy may prevent the mobile device from displaying some particular managed account information while displaying other particular managed account information from the same managed account. In some embodiments, a first MAM policy may prevent the mobile device from sending information (e.g., first managed user account information) to and/or receive information from one or more other devices. For example, data associated with a first managed user account may be interacted with by the user of the mobile device when the first managed user account is currently in focus. In such an example, a second managed account might not be interacted with by the user until the second managed user account is currently in focus. A user account may be in focus when, for example, that user account is selected by the user. In some embodiments, a MAM policy may affect applications in addition to the multi-account managed application (e.g., a partially managed application) present at the mobile device. For example, a MAM policy may prevent another application from being opened or otherwise executed and may close the application if it is currently being executed (e.g., running) at the mobile device.

In some embodiments, another first MAM policy may permit access to some network resources while not other network resources. For example, a policy may prevent the mobile device from accessing one or more network resources by, for example, blocking access to certain websites, particular enterprise resources, and/or any other remotely located resources.

In some embodiments, another first MAM policy may selectively enable and/or disable functionality within other software and/or hardware of the mobile device. For example, a policy may prevent or block access to resources of the mobile device such as, for example, camera functionality, text message functionality, Bluetooth functionality, local application functionality, and/or any other functionality of the mobile device.

In some embodiments, the secure application wrapper running on the mobile device may generate and execute commands to enforce policies. The secure application wrapper may generate the commands based on state information of the mobile device monitored by the secure application wrapper. For example, the secure application wrapper may detect a change in the state information of the mobile device and, as a result, may analyze the state information for compliance with the policies. The mobile device may execute operations to prevent violations of one or more policies and/or fix or otherwise remedy violations in policies detected by the secure application wrapper. For example, a command may add, delete, and/or modify data of the mobile device. For example, the command may be configured to perform a selective wipe operation at the mobile device. Particularly, when such a command is executed, the mobile device may delete data associated with one or more of the managed accounts (e.g., the first managed user account and/or the second managed user account). For example, the command may be configured to reconfigure functionality (e.g., selectively enabling and/or disabling functionality) of the multi-account managed application, other software present on the mobile device, and/or other functionality of the mobile device.

In some embodiments, the MAM service provider may generate the commands. Particularly, the secure application wrapper may send to the MAM service provider state information, change in state information, and/or an indication of a MAM policy potentially violated or may soon be violated, and/or any other information. The MAM service provider may analyze the state information and one or more policies and, based on the analysis, generate commands to enforce the policies. The MAM service provider may send the commands to the mobile device. The secure application wrapper may execute the commands and, in response, may send to the MAM service provider updated state information and/or an indication that an operation associated with the received command was completed.

In some embodiments, if the secure application wrapper and/or the MAM service provider detects violations in policies. The secure application wrapper and/or the MAM service provider may generate commands to fix the policy violations.

In some embodiments, each account may be associated with a different user. For instance, the first managed user account may be associated with a first user and the second managed user account may be associated with a second user different from the first user. As a result, the same mobile device may be shared by multiple users. For example, a hospital may include one or more nurse stations that may include one or more shared mobile devices to be shared by multiple nurses. A first nurse may be associated with the first managed user account and a second nurse may be associated with the second managed user account. In this instance, the first MAM service provider and the second MAM service provider are the same entity, namely the hospital. However, the MAM service provider (e.g., the first and second MAM service provider) may provide different MAM policies for each of the managed user accounts. As a result, the first managed user account of the first nurse may be subject to different policies than that of the second managed user account of the second nurse. In some embodiments, both the first and second managed user accounts may be active or in focus at the same time. Additionally or alternatively, only one user account may be active or in focus at any given time. The secure application wrapper may determine which account is in focus or active based on the user who has logged into the application and/or mobile device. In some embodiments, data associated with each user account may be stored in separate data vaults specific to each user account.

In one some embodiments, a shared mobile device may have one or more accounts for a user and one or more accounts for another user. For example, a first managed user account and a second managed user account may be associated with a first nurse and a third managed user account and a fourth managed user account may be associated with a second nurse. The first and third managed user accounts may be associated with MAM policies set by a first hospital. Similarly, the second and fourth managed user accounts may be associated with MAM policies set by a second hospital different from the first hospital.

Typically, an application can only be managed by MAM service providers in one context. For example, either the entire application (including every user account associated with the application) is managed according to MAM policies provided by a MAM service provider or none of the application (e.g., no part of the application including none of the user accounts) is managed according to the MAM policies provided by the MAM service provider. Additionally, the application might not be able to be managed in accordance with first MAM policies provided by first MAM service provider while the application is being managed by second MAM policies provided by a second MAM service provider. Typically, account data and policies may be wiped in order to switch from an application managed according to first MAM policies to an application managed by second MAM policies. Based on the method depicted in FIG. 5 described above, the mobile device (and/or the secure application wrapper running on the mobile device) may implement the context at a task level. As a result, the secure application wrapper may tag each task within the application with an account context thereby facilitating management of the application at a much finer granularity than the application as a whole, namely the application may be managed on a per user account basis. Particularly, because the secure application wrapper may tag each thread with the user account context and because multiple threads may be processed in parallel (i.e., parallel processing), the MAM policies associated with each tag may be enforced upon each thread (e.g., task) in parallel or substantially in parallel.

Figure 8:
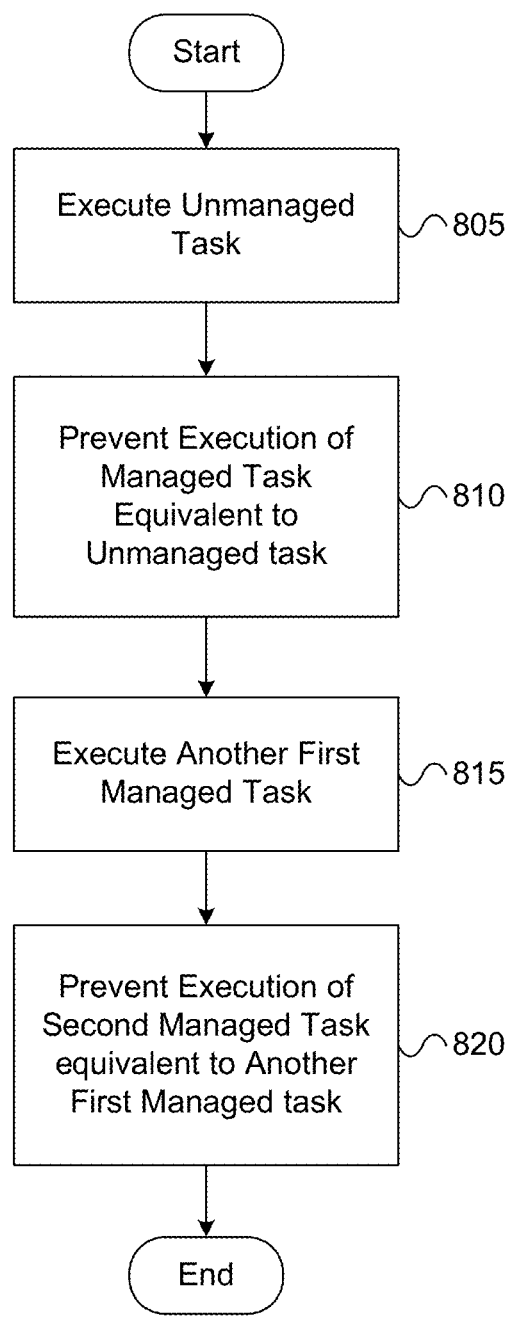
FIG. 8 depicts a flowchart that illustrates a method of executing a task while preventing a semantically equivalent task in accordance with one or more illustrative aspects discussed herein.

FIG. 8 depicts a flowchart that illustrates a method of executing a task while preventing a semantically equivalent task in accordance with one or more illustrative aspects discussed herein. In one or more embodiments, the method of FIG. 8 and/or one or more steps thereof may be performed by a computing device (e.g., generic computing device 201). In other embodiments, the method illustrated in FIG. 8 and/or one or more steps thereof may be embodied in computer-executable instructions that are stored in a computer-readable medium, such as a non-transitory computer-readable memory.

As seen in FIG. 8, the method may begin at step 805 in which a mobile device may execute one or more tasks independent of a set of MAM policies provided by a MAM service provider. For example, in step 805, a mobile device may execute a particular unmanaged task of one or more unmanaged tasks associated with an unmanaged user account of a partially managed application. The unmanaged tasks may be one or more tasks executed by the mobile device without being subject to one or more MAM policies. The unmanaged user account may be an account that can be used with the application without being subject to one or more MAM policies. Specifically, the mobile device may execute the particular unmanaged task independent of a first set of MAM policies set by a first MAM service provider associated with a first managed user account of the partially managed application. In executing the unmanaged task independent of a set of MAM policies, the mobile device may, for example, perform an operation on data associated with the unmanaged user account even if a MAM policy would prohibit such an operation. For instance, in executing an unmanaged cut and paste task independent of one or more policies, the mobile device may perform a cut and paste operation on text associated with the unmanaged account even if the first MAM policy prohibits cut and paste operations on text associated with a first managed user account. In other words, the mobile device may execute the cut and paste operation on text associated with the unmanaged user account without enforcing any of the MAM policies included in the first set of MAM policies. Similarly, the mobile device may execute the particular unmanaged task independent of a second set of MAM policies set by a second MAM service provider associated with a second managed user account of the partially managed application. In executing the unmanaged task independent of the second set of MAM policies, the mobile device may, for example, perform a cut and paste operation on text associated with the unmanaged user account even if a second MAM policy prohibits cut and paste operations on text associated with a second managed user account. In other words, the mobile device may execute the cut and paste operation on text associated with the unmanaged user account without enforcing any the MAM policies included in the second set of MAM policies.

The unmanaged task being executed in step 805 may be semantically equivalent to a particular first managed task of one of more first managed tasks associated with the first managed user account. In particular, an unmanaged task may be considered "semantically equivalent" to a managed task when the operation performed with respect to the unmanaged user account is the same operation performed with respect to the managed user account. For example, a cut and paste task on text associated with unmanaged user account is semantically equivalent to a cut and paste task on text associated with a managed user account. The mobile device (and/or the secure application wrapper running on the mobile device) may monitor and determine whether the first managed task, if executed by the mobile device, would violate the first set of MAM policies. The mobile device may make this determination prior to executing the first managed task.

In response, in step 810, the mobile device (and/or the secure application wrapper) may prevent execution of the first managed task (which is semantically equivalent to unmanaged task). For example, in step 810, the mobile device may prevent the first managed task of the one or more first managed tasks from being executed when the first managed task if executed would violate the first set of MAM policies.

For example, the unmanaged task being executed in step 805 may be a cut and paste operation associated with the unmanaged user account. The cut and paste operation may be configured to remove and insert text into unmanaged user account data displayed at the mobile device. The first managed task may also be a cut and paste operation configured to remove and insert text into first managed user account data displayed at the mobile device. Because both the unmanaged task and the first managed task are a cut and paste operation, the unmanaged task and the first managed task are semantically equivalent to one another. A MAM policy within the first set of MAM policies may prohibit such cut and paste operations. However, because the mobile device executes the unmanaged task (e.g., the cut and paste operation on text associated with the unmanaged user account) independent of the first set of MAM policies, the MAM policy prohibiting the cut and paste operation has no effect on the execution of the unmanaged task. Thus, the mobile device may execute the cut and paste operation on text associated with the particular unmanaged user account despite the prohibition of the cut and paste operation by the MAM policy. On the other hand, the mobile device may prevent execution of the cut and paste operation associated with the first managed task (e.g., the cut and paste operation on text associated with the first managed user account) based on the MAM policy configured to prohibit the cut and paste operation. As a result, the mobile device may perform the unmanaged task (e.g., the cut and paste operation on text associated with the unmanaged user account) while preventing performance of the first managed task (e.g., the cut and paste operation on text associated with the first managed user account).

Similarly, the unmanaged task (e.g., the cut and paste operation on text associated with the unmanaged user account) may be semantically equivalent to a second managed task associated with the second managed user account (e.g., a cut and paste operation on text associated with the second managed user account). The mobile device may execute the particular unmanaged task independent of a second set of MAM policies provided by a MAM service provider. The mobile device may execute the particular second managed task in accordance with the second set of MAM policies. The mobile device (and/or the secure application wrapper running on the mobile device) may monitor and determine whether the particular second managed task, if executed by the mobile device, would violate the second set of MAM policies. In response to a determination that the second managed task would violate a MAM policy of the second set of MAM policies (e.g., a MAM policy configured to prevent cut and paste operations), the mobile device may prevent execution of the second managed task. As a result, the mobile device may execute the cut and paste operation on text associated with the unmanaged user account and the mobile device may prevent execution of the cut and paste operation on text associated with the second managed user account.

In step 815, the mobile device may execute another first managed task in accordance with the first set of MAM policies (also referred to herein as a specific first managed task). The specific first managed task may be, for example, a copy operation on text associated with the first managed user account. The mobile device (and/or the secure application wrapper) may monitor and determine whether execution of the specific first managed task would violate a MAM policy of the first set of MAM policies. In this example, because the first set of MAM policies permits the specific first managed task (e.g., the copy operation on text associated with the first managed user account), the mobile device may execute the specific first managed task.

The specific first managed task may be semantically equivalent to another second managed task (also referred to herein as a specific second managed task). The specific second managed task may be, for example, a copy operation on text associated with the second managed user account. The mobile device (and/or the secure application wrapper) may monitor and determine whether execution of the specific second managed task would violate a MAM policy of the second set of MAM policies.

In response, in step 820, the mobile device (and/or the secure application wrapper) may prevent execution of the specific second managed task. For example, in step 820, the mobile device may prevent the specific second managed task of the one or more second managed tasks from being executed when the specific second managed task if executed would violate the second set of MAM policies. For example, the mobile device may execute the copy operation on text associated with the first managed user account and the mobile device may prevent execution of the copy operation on text associated with second managed user account. In some embodiments, the mobile device may execute a copy operation on text associated with the unmanaged user account because the mobile device may execute one or more unmanaged tasks independent of the first set of MAM policies and independent of the second set of MAM policies.

Figure 9:
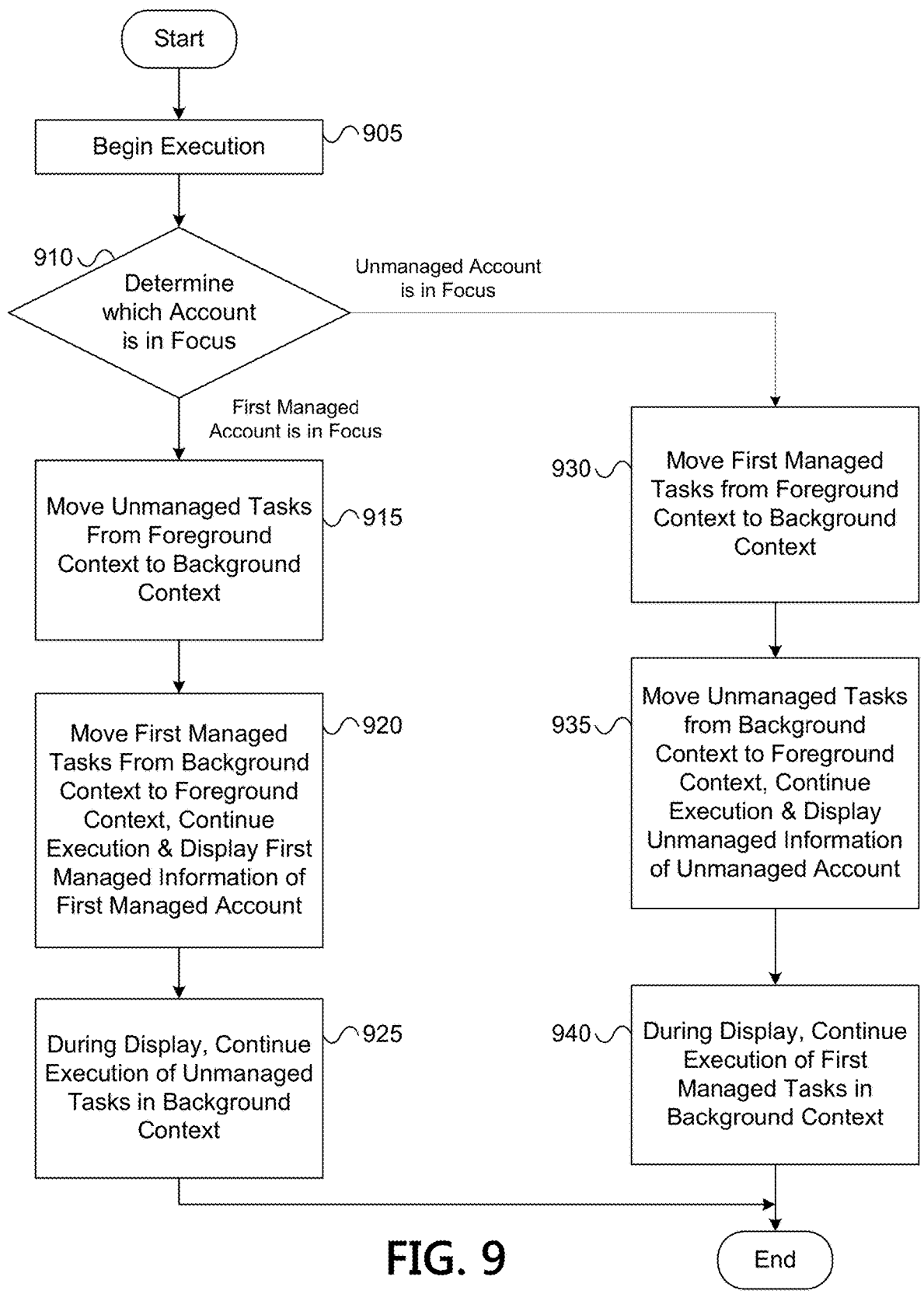
FIG. 9 depicts a flowchart that illustrates a method of switching between managed tasks and unmanaged tasks based on which user account of a partially managed application is in focus in accordance with one or more illustrative aspects discussed herein.

FIG. 9 depicts a flowchart that illustrates a method of switching between managed tasks and unmanaged tasks based on which user account of a partially managed application is in focus in accordance with one or more illustrative aspects discussed herein. In one or more embodiments, the method of FIG. 9 and/or one or more steps thereof may be performed by a computing device (e.g., generic computing device 201). In other embodiments, the method illustrated in FIG. 9 and/or one or more steps thereof may be embodied in computer-executable instructions that are stored in a computer-readable medium, such as a non-transitory computer-readable memory.

As seen in FIG. 9, the method may begin at step 905 in which a mobile device may begin executing one or more tasks (e.g., one or more unmanaged tasks and one or more first managed tasks). For example, in step 905, the mobile device may begin executing one or more unmanaged tasks in a foreground context of the partially managed application and executing one or more first managed tasks in a background context of the partially managed application. The one or more tasks that the mobile device is executing in the foreground context may, for instance, interact with data that is currently being displayed or otherwise presented by the mobile device via one or more user interfaces, whereas the one or more tasks that the mobile device is executing in the background context may, for instance, interact with data that is not currently being displayed or otherwise presented by the mobile device via one or more user interfaces. For instance, the foreground context may be a context in which a user of the mobile device may interact with the user account currently presented by the mobile device. For example, the mobile device may display information associated with the unmanaged user account when the one or more unmanaged tasks are being executed in the foreground context. For example, an account is in the foreground context when the account is selected by a user at the mobile device. In an instance where the mobile device presents multiple accounts each in a different window, the single active window is the foreground context even if other windows are concurrently displayed by the mobile device. Additionally or alternatively, the mobile device may receive user input from the user associated with the unmanaged user account. In response, the mobile device may execute commands and/or operations associated with the unmanaged user account. The background context may be a context in which a user of the mobile device might not be able to interact with the account currently in the background context. For example, the mobile device may synchronize locally-stored data of first managed user account with remotely-stored data (e.g., data stored in a cloud computing architecture) in the background context. The mobile device might not display such data of the first managed user account because the sync is being executed within the background context.

In step 910, the mobile device may determine which user account is currently in focus. For example, in step 910, after the mobile device has begun executing the one or more unmanaged tasks in the foreground context, the mobile device may determine that the first managed user account is currently in focus. The first managed user account may be considered currently in focus when the mobile device determines that there is some indication that the user may, in the near future (e.g., within a predetermined amount of time), interact with the first managed user account in a foreground context (e.g., the mobile device may display information of the first managed user account and receive input from the user regarding the first managed user account).

For example, the mobile device may determine that the first managed user account is currently in focus based on user input (e.g., the user input may be a request to login to the first managed user account received by the mobile device from the user). For example, the mobile device may determine that the first managed user account is currently in focus based on an indication that the mobile device is within a geographical fence (also referred to herein as a geofence) of a first MAM service provider. Particularly, the first MAM service provider (e.g., a corporation or other entity) may set a geofence (e.g., a perimeter defined by, for example, geographic location). The geofence may be associated with the location of a building or campus of the first MAM service provider and/or the home of the user. The mobile device (and/or the secure application wrapper) may monitor state information of the mobile device including the global positioning system (GPS) location of the mobile device. The mobile device may determine from the monitored state information that the mobile device is currently within the geofence and, in response, may automatically indicate/determine that the first managed user account is currently in focus. For example, the mobile device may determine that the first managed user account is currently in focus based on an indication that the mobile device has established a network connection with the first MAM service provider. Particularly, the mobile device (and/or the secure application wrapper) may determine based on the monitored state information that the mobile device has connected to the intranet or other network of the entity and, in response, may determine that the first managed user account is currently in focus. Additionally or alternatively, for example, the mobile device may determine that the first managed user account is currently in focus based on a command received by the mobile device requesting the mobile device to move the one or more first managed tasks to the foreground context. Particularly, the first MAM service provider (e.g., the entity) may determine that the first managed user account is currently in focus and, in response, may send a command to the mobile device indicating that the first managed user account is currently in focus.

In step 915, the mobile device may move unmanaged tasks from the foreground context to the background context. For example, in response to determining in step 910 that the first managed user account is currently in focus, the mobile device (and/or the secure application wrapper) may, in step 915, initiate movement of execution of the one or more unmanaged tasks to the background context. Once moved, the user of the mobile device might no longer be able to interact with the unmanaged tasks and/or the unmanaged user account.

In step 920, the mobile device may move first managed tasks from the background context to the foreground context. For example, in response to determining in step 910 that the first managed user account is currently in focus, the mobile device (and/or the secure application wrapper) may, in step 920, initiate movement of execution of the one or more first managed tasks to the foreground context for execution. Once moved, the user of the mobile device may be able to interact with the first managed tasks and/or the first managed user account. For example, the mobile device may display first managed information of the first managed user account when the one or more first managed tasks is within the foreground context. The mobile device may also continue execution of the one or more first managed tasks. For example, one or more of the first managed tasks may include syncing the first managed information with the first MAM service provider. The mobile device may have begun the syncing in the background context of the partially managed application. Once moved to the foreground context, the mobile device may continue execution of the syncing of the first managed information with the first MAM service provider.

In step 925, the mobile device may continue execution of the unmanaged tasks in the background context of the partially managed application. For example, in step 925, during the displaying of the first managed information by the mobile device, the mobile device may continue execution of the one or more unmanaged tasks in the background context independent of the first set of MAM policies. For example, one or more of the unmanaged tasks may be a sync operation to sync unmanaged user account information with an unmanaged service provider. The mobile device may begin execution of the sync operation in the foreground context of the partially managed application when, for example, the unmanaged user account is currently in focus.

In executing one or more tasks of an account independent of one or more particular sets of MAM policies provided by one or more MAM service providers as described herein, the mobile device (and/or the secure application wrapper running on the mobile device) may block enforcement of the one or more particular sets of MAM policies on the user accounts independent of the one or more particular sets of MAM policies. For example, the mobile device may block enforcement of the first set of MAM polices on the one or more unmanaged tasks. In blocking the enforcement, the mobile device may override the first set of MAM policies when the first set of MAM policies apply to the one or more unmanaged tasks.

After step 925, the method may return to step 910 where the mobile device may again determine which user account is currently in focus. If the first managed user account is still currently in focus, steps 915-925 may be repeated. Alternatively, if the unmanaged user account is now currently in focus or if in the first instance of doing the determining of step 910 the unmanaged user account was in focus, the method may proceed to step 930 in which the first managed tasks may be moved to the background context.

In particular, in step 930, the mobile device may move the first managed tasks from the foreground context to the background context of the partially managed application. For example, in step 930, in response to determining that the unmanaged user account is currently in focus, the mobile device (and/or the secure application wrapper) may initiate movement of execution of the one or more first managed tasks from the foreground context to the background context. Once moved, the user of the mobile device might no longer be able to interact with the one or more first managed tasks and/or the first managed user account.

In some embodiments, the mobile device (and/or the secure application wrapper) may initiate and move execution of the one or more first managed tasks from the foreground context to the background context for other reasons. For example, the mobile device may move execution of the one or more first managed tasks in response to user input, an indication that the mobile device is outside of the geofence set by the first MAM service provider, a command received from the first MAM service provider requesting the mobile device to move the first managed tasks to the background context, an indication that the mobile device no longer has a network connection with the first MAM service provider, an indication that another account different from the first managed user account is currently in focus, an indication that the first managed user account is not currently in focus, and/or other monitored state information of the partially managed application and/or the mobile device.

In step 935, the mobile device may move the unmanaged tasks from the background context to the foreground context. For example, in step 935, in response to determining that the unmanaged user account is currently in focus, the mobile device may initiate movement of execution of the one or more unmanaged tasks from the background context to the foreground context for execution. Once moved, the user of the mobile device may interact with the unmanaged tasks and/or the unmanaged user account. For example, the mobile device may display unmanaged information of the unmanaged user account when the one or more unmanaged tasks are within the foreground context. The mobile device may also continue execution of the one or more unmanaged tasks in the foreground context independent of the first set of MAM policies. For example, one or more of the unmanaged tasks may include syncing the unmanaged information with the unmanaged service provider. The mobile device may have begun the syncing in the background context of the partially managed application. Once moved to the foreground context, the mobile device may continue execution of the syncing of the unmanaged information with the unmanaged service provider. In some embodiments, the mobile device may block enforcement of the first set of MAM polices on the one or more unmanaged tasks. In blocking the enforcement, the mobile device may override the first set of MAM policies when the first set of MAM policies apply to the one or more unmanaged tasks.

In step 940, the mobile device may continue execution of the one or more first managed tasks in the background context of the partially managed application. For example, in step 940, during the continuing execution of the unmanaged tasks (e.g., during the displaying of the unmanaged information) by the mobile device, the mobile device may continue executing the one or more first managed tasks in the background context in accordance with the first set of MAM policies. For example, one or more of the first managed tasks may be a sync operation to sync first managed user account information with the first MAM service provider. The mobile device may begin execution of the sync operation (i.e., a first managed task) in the foreground context of the partially managed application when, for example, the first managed user account is currently in focus and continue execution in the background when either the unmanaged user account is in focus and/or when the first managed user account is not currently in focus.

In some embodiments, the mobile device may begin execution of the one or more first managed tasks in the foreground context. In some embodiments, the mobile device may begin execution of the one or more first managed tasks and the one or more unmanaged tasks in the foreground context.

After step 940, the method may return to step 910 where the mobile device may again determine which user account is currently in focus. If the first managed user account is currently in focus, steps 915-925 may be repeated. Alternatively, if the unmanaged user account is currently in focus, steps 930-940 may be repeated.

Figure 10:
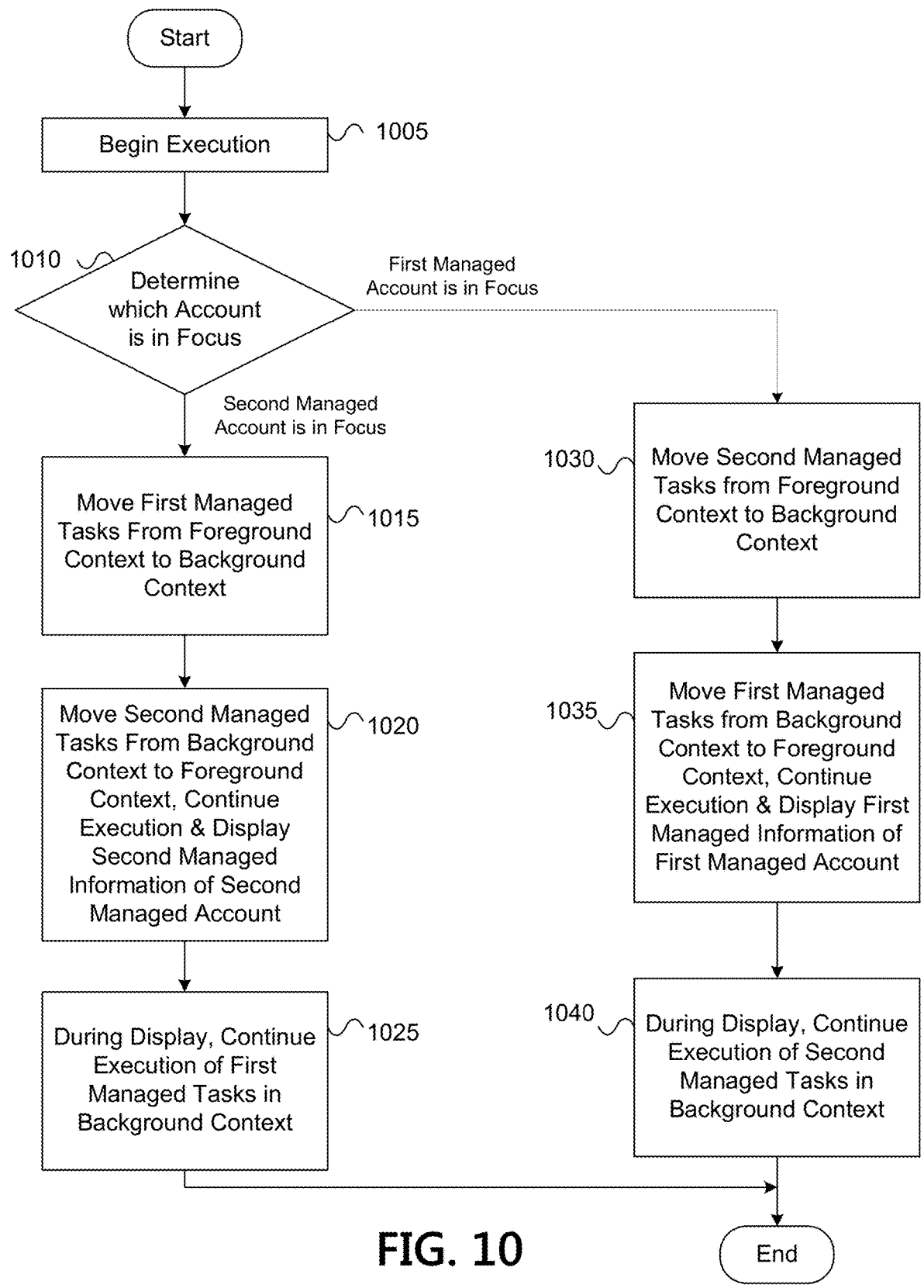
FIG. 10 depicts a flowchart that illustrates a method of switching between first managed tasks and second managed tasks based on which user account of a multi-account managed application is in focus in accordance with one or more illustrative aspects discussed herein.

FIG. 10 depicts a flowchart that illustrates a method of switching between first managed tasks and second managed tasks based on which account of a multi-account managed application is in focus in accordance with one or more illustrative aspects discussed herein. In one or more embodiments, the method of FIG. 10 and/or one or more steps thereof may be performed by a computing device (e.g., generic computing device 201). In other embodiments, the method illustrated in FIG. 10 and/or one or more steps thereof may be embodied in computer-executable instructions that are stored in a computer-readable medium, such as a non-transitory computer-readable memory.

As seen in FIG. 10, the method may begin at step 1005 in which a mobile device may begin executing one or more tasks (e.g., one or more first managed tasks and one or more second managed tasks). For example, in step 1005, the mobile device may begin executing one or more first managed tasks in a foreground context of the multi-account managed application and executing one or more second managed tasks in a background context of the multi-account managed application. The one or more tasks that the mobile device is executing in the foreground context may, for instance, interact with data that is currently being displayed or otherwise presented by the mobile device via one or more user interfaces, whereas the one or more tasks that the mobile device is executing in the background context may, for instance, interact with data that is not currently being displayed or otherwise presented by the mobile device via one or more user interfaces. For instance, the foreground context may be a context in which a user of the mobile device may interact with the user account currently presented by the mobile device. For example, the mobile device may display information associated with the first managed user account when the one or more first managed tasks are being executed in the foreground context. Additionally or alternatively, the mobile device may receive user input from the user associated with the first managed user account. In response, the mobile device may execute commands and/or operations associated with the first managed user account. The background context may be a context in which a user of the mobile device might not be able to interact with the account currently in the background context. For example, the mobile device may synchronize locally-stored data of the second managed user account with remotely stored-data in the background context. The mobile device might not be able to display such data of the second managed user account because the sync is being executed within the background context.

In step 1010, the mobile device may determine which account is currently in focus. For example, in step 1010, after the mobile device has begun executing the one or more first managed tasks in the foreground context, the mobile device may determine that the second managed user account is currently in focus. The second managed user account may be considered currently in focus when the mobile device determines that there is some indication that the user may, in the near future (e.g., within a predetermined period of time), interact with the second managed user account in a foreground context (e.g., the mobile device may display second managed user account information and receive input from the user regarding the second managed user account).

For example, the mobile device may determine that the second managed user account is currently in focus based on user input (e.g., the user input may be a request to login to the second managed user account received by the mobile device from the user). For example, the mobile device may determine that the second managed user account is currently in focus based on an indication that the mobile device is within a geographical fence (also referred to herein as a geofence) of a second MAM service provider. Particularly, the second MAM service provider (e.g., a corporation or other entity) may set a geofence (e.g., a perimeter defined by, for example, geographic locations). The geofence may be associated with the location of a building or campus of the second MAM service provider and/or the home of the user. The mobile device (and/or the secure application wrapper) may monitor state information of the mobile device including the GPS location of the mobile device. The mobile device may determine from the monitored state information that the mobile device is currently within the geofence and, in response, may automatically indicate/determine that the second managed user account is currently in focus. For example, the mobile device may determine that the second managed user account is currently in focus based on an indication that the mobile device has established a network connection with the second MAM service provider. Particularly, the mobile device (and/or the secure application wrapper) may determine based on the monitored state information that the mobile device has connected to the intranet or other network of the entity and, in response, may determine that the second managed user account is currently in focus. Additionally or alternatively, for example, the mobile device may determine that the second managed user account is currently in focus based on a command received by the mobile device requesting the mobile device to move the one or more second managed tasks to the foreground context. Particularly, the second MAM service provider (e.g., the entity) may determine that the second managed user account is currently in focus and, in response, may send a command to the mobile device indicating that the second managed user account is currently in focus.

In step 1015, the mobile device may move first managed tasks from the foreground context to the background context. For example, in response to determining in step 1010 that the second managed user account is currently in focus, the mobile device (and/or the secure application wrapper) may, in step 1015, initiate movement of execution of the one or more first managed tasks to the background context. Once moved, the user of the mobile device might no longer be able to interact with the first managed tasks and/or the first managed user account.

In step 1020, the mobile device may move second managed tasks from the background context to the foreground context. For example, in response to determining in step 1010 that the second managed user account is currently in focus, the mobile device (and/or the secure application wrapper) may, in step 1020, initiate movement of execution of the one or more second managed tasks to the foreground context for execution. Once moved, the user of the mobile device may be able to interact with the second managed tasks and/or the second managed user account. For example, the mobile device may display second managed information of the second managed user account when the one or more second managed tasks are within the foreground context. The mobile device may also continue execution of the one or more second managed tasks in the foreground context in accordance with the second set of MAM policies. For example, one or more of the second managed tasks may include syncing the second managed information with the second MAM service provider. The mobile device may have begun the syncing in the background context of the multi-account managed application. Once moved to the foreground context, the mobile device may continue execution of the syncing of the second managed information with the second MAM service provider. In some embodiments, the mobile device may block enforcement of the first set of MAM polices on the one or more second managed tasks. In blocking the enforcement, the mobile device may override the first set of MAM policies when the first set of MAM policies apply to the one or more second managed tasks.

In step 1025, the mobile device may continue execution of the first managed tasks in the background context of the multi-account managed application. For example, in step 1025, during the displaying of the second managed information by the mobile device, the mobile device may continue execution of the one or more first managed tasks in the background context in accordance with the first set of MAM policies and independent of the second set of MAM policies. For example, one or more of the first managed tasks may be a sync operation to sync first managed user account information with a first MAM service provider. The mobile device may begin execution of the sync operation in the foreground context of the multi-account managed application when, for example, the first managed user account is currently in focus. In some embodiments, the mobile device may block enforcement of the second set of MAM polices on the one or more first managed tasks. In blocking the enforcement, the mobile device may override the second set of MAM policies when the second set of MAM policies apply to the one or more first managed tasks.

After step 1025, the method may return to step 1010 where the mobile device may again determine which user account is currently in focus. If the second managed user account is still currently in focus, steps 1015-1025 may be repeated. Alternatively, if the first managed user account is now currently in focus or if in the first instance of doing the determining of step 1010 the first managed user account was in focus, the method may proceed to step 1030 in which the first managed tasks may be moved to the background context.

In particular, in step 1030, the mobile device may move the second managed tasks from the foreground context to the background context of the multi-account managed application. For example, in step 1030, in response to determining that the first managed user account is currently in focus, the mobile device (and/or the secure application wrapper) may initiate movement of execution of the one or more second managed tasks from the foreground context to the background context. Once moved, the user of the mobile device might no longer be able to interact with the one or more second managed tasks and/or the second managed user account.

In some embodiments, the mobile device (and/or the secure application wrapper) may initiate and move execution of the one or more second managed tasks from the foreground context to the background context for other reasons. For example, the mobile device may move execution of the one or more second managed tasks in response to user input, an indication that the mobile device is outside of the geofence set by the second MAM service provider, a command received from the second MAM service provider requesting the mobile device to move the second managed tasks to the background context, an indication that the mobile device no longer has a network connection with the second MAM service provider, an indication that another account different from the second managed user account is currently in focus, an indication that the second managed user account is not currently in focus, and/or other monitored state information of the multi-account managed application and/or the mobile device.

In step 1035, the mobile device may move the first managed tasks from the background context to the foreground context. For example, in step 1035, in response to determining that the first managed user account is currently in focus, the mobile device may initiate movement of execution of the one or more first managed tasks from the background context to the foreground context for execution. Once moved, the user of the mobile device may interact with the first managed tasks and/or the first managed user account. For example, the mobile device may display first managed information of the first managed user account when the one or more first managed tasks is within the foreground context. The mobile device may also continue execution of the one or more first managed tasks in the foreground context in accordance with the first set of MAM policies and independent of the second set of MAM policies. For example, one or more of the first managed tasks may include syncing the first managed information with the first MAM service provider. The mobile device may have begun the syncing in the background context of the multi-account managed application. Once moved to the foreground context, the mobile device may continue execution of the syncing of the first managed information with the first MAM service provider. In some embodiments, the mobile device may block enforcement of the second set of MAM polices on the one or more first managed tasks. In blocking the enforcement, the mobile device may override the second set of MAM policies when the second set of MAM policies apply to the one or more first managed tasks.

In step 1040, the mobile device may continue execution of the one or more second managed tasks in the background context of the multi-account managed application. For example, in step 1040, during the continuing execution of the first managed tasks (e.g., during the displaying of the first managed information) by the mobile device, the mobile device may continue executing the one or more second managed tasks in the background context in accordance with the second set of MAM policies and independent of the first set of MAM policies. For example, one or more of the second managed tasks may be a sync operation to sync second managed user account information with the second MAM service provider. The mobile device may begin execution of the sync operation (i.e., a second managed task) in the foreground context of the multi-account managed application when, for example, the second managed user account is currently in focus and continue execution in the background when either the first managed user account is in focus and/or when the second managed user account is not currently in focus. In some embodiments, the mobile device may block enforcement of the first set of MAM polices on the one or more second managed tasks. In blocking the enforcement, the mobile device may override the first set of MAM policies when the first set of MAM policies apply to the one or more second managed tasks.

In some embodiments, the mobile device may begin execution of the one or more second managed tasks in the foreground context. In some embodiments, the mobile device may begin execution of the one or more second managed tasks and the one or more first managed tasks in the foreground context.

After step 1040, the method may return to step 1010 where the mobile device may again determine which user account is currently in focus. If the second managed user account is currently in focus, steps 1015-1025 may be repeated. Alternatively, if the first managed user account is currently in focus, steps 1030-1040 may be repeated.

Figure 11:
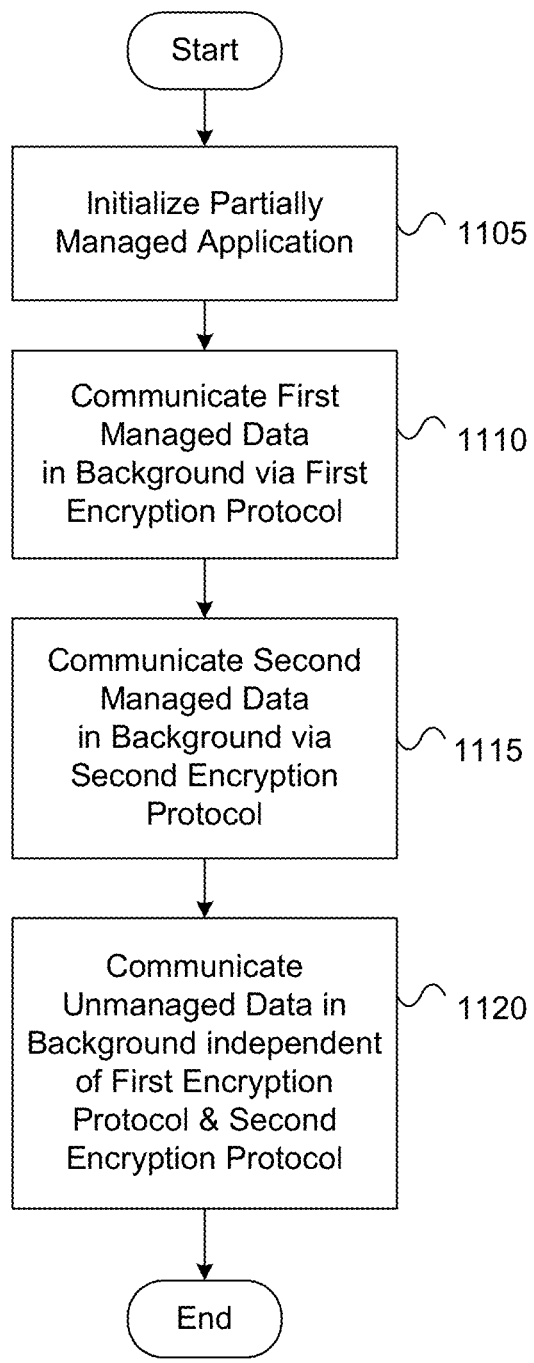
FIG. 11 depicts a flowchart that illustrates a method of performing tasks in a background context in accordance with one or more illustrative aspects discussed herein.

FIG. 11 depicts a flowchart that illustrates a method of performing tasks in a background context in accordance with one or more illustrative aspects discussed herein. In one or more embodiments, the method of FIG. 11 and/or one or more steps thereof may be performed by a computing device (e.g., generic computing device 201). In other embodiments, the method illustrated in FIG. 11 and/or one or more steps thereof may be embodied in computer-executable instructions that are stored in a computer-readable medium, such as a non-transitory computer-readable memory.

As seen in FIG. 11, the method may begin at step 1105 in which a mobile device may initialize a partially managed application. For example, in step 1105, a mobile device may initialize a partially managed application associated with one or more of a first managed user account for a user, a second managed user account for the same user, and/or an unmanaged user account for the same user. The mobile device may execute in the background context of the partially managed application one or more unmanaged tasks, one or more first managed tasks, and/or one or more second managed tasks.

In step 1110, the mobile device may execute one or more first managed tasks in the background context in accordance with the first set of MAM policies. For example, in step 1110, the one or more first managed tasks may include communicating with another device outside of the mobile device. Particularly, the mobile device may communicate, in the background context, first managed information associated with the first managed user account with another device (e.g., a server of the first MAM service provider) in accordance with a first set of MAM policies provided by a first MAM service provider and independent of a second set of MAM policies provided by a second MAM service provider. The first set of MAM policies may mandate that the communications with the other device must be encrypted in accordance with a first encryption protocol. As a result, the mobile device (and/or the secure application wrapper) may encrypt the communications and then send the communications to the other device. The mobile device may also receive encrypted communications from the other device and then may decrypt the encrypted communications.

In step 1115, the mobile device may execute one or more second managed tasks in the background context in accordance with the second set of MAM policies. For example, in step 1115, the one or more second managed tasks may include communicating with another device outside of the mobile device. Particularly, the mobile device may communicate, in the background context, second managed information associated with the second managed user account with another device (e.g., a server of the second MAM service provider) in accordance with the second set of MAM policies provided by the second MAM service provider and independent of the first set of MAM policies provided by the first MAM service provider. The second set of MAM policies may mandate that the communications with the other device (e.g., the second MAM service provider) must be encrypted in accordance with a second encryption protocol. The second encryption protocol may be different than the first encryption protocol. As a result, the mobile device (and/or the secure application wrapper) may encrypt the communications and then send the communications to the other device. The mobile device may also receive encrypted communication from the other device and then may decrypt the encrypted communications. In some embodiments, the mobile device may, during the execution of the one or more first managed tasks, execute the one or more second managed tasks.

In step 1120, the mobile device may execute one or more unmanaged tasks in the background context. For example, in step 1120, the one or more unmanaged tasks may include communicating with another device outside of the mobile device. Particularly, the mobile device may communicate, in the background context, unmanaged information associated with the unmanaged user account with another device (e.g., a server of the unmanaged service provider) independent of the first set of MAM policies and independent of the second set of MAM policies. As a result, the mobile device may send the communications associated with the unmanaged user account in an unencrypted form (e.g., without using any encryption protocol mandated by the first or second set of MAM policies). In some embodiments, the communication associated with the unmanaged user account may be encrypted according a third encryption protocol and then send the encrypted communications to the other device. The third encryption protocol may be different from the first encryption protocol and the second encryption protocol. In some embodiments, the mobile device may, during the execution of the one or more first managed tasks and/or the execution of the one or more second managed tasks, execute the one or more unmanaged tasks.

In some embodiments, the mobile device may execute two or more of steps 1110-1120 substantially concurrently. In particular, the mobile device may concurrently execute in the background context one or more first managed tasks, one or more second managed tasks, and/or one or more unmanaged tasks. For example, the mobile device may communicate with resources of different MAM service providers or another service provider substantially concurrently. In some embodiments, the steps 1110-1120 may be performed in any order and, in some instances, may be performed repeatedly in different orders.

The encryption protocols discussed above may be any encryption protocol. For example, the first encryption protocol may be a point to point protocol and the second encryption protocol may be a transport layer protocol. One or more of the protocols may include public-key infrastructure (PKI) and/or any other encryption technique.

As illustrated above, various aspects of the disclosure relate to providing mobile application management functionalities. In other embodiments, however, the concepts discussed herein can be implemented in any other type of computing device (e.g., a desktop computer, a server, a console, a set-top box, a mobile phone, etc.). Thus, although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A method comprising:
   executing, by a mobile device, a partially managed application associated with a first managed user account and an unmanaged user account,
      wherein the partially managed application is configured to perform a plurality of tasks for the unmanaged user account, and
      wherein the partially managed application is configured to perform a first subset of the plurality of tasks for the first managed user account in accordance with a first set of managed policies, wherein the first set of managed policies specifies the first subset of the plurality of tasks;
   monitoring, by the mobile device, state information of the mobile device;
   determining, based on a change in the state information of the mobile device and based on the first set of managed policies, whether the first managed user account or the unmanaged user account should be in focus; and
   in response to determining that the first managed user account should be in focus,
      moving a task for the unmanaged user account from a foreground context and to a background context for continued execution; and
      moving a task for the first managed user account from the background context and to the foreground context for continued execution.

2. The method of claim 1, wherein the determining that the first managed user account should be in focus is in response to the mobile device entering a geofence specified by the first set of managed policies.

3. The method of claim 2, further comprising:
   in response to determining that the mobile device has exited the geofence specified by the first set of managed policies,
      moving the task for the unmanaged user account from the background context and to the foreground context for continued execution; and
      moving the task for the first managed user account from the foreground context and to the background context for continued execution.

4. The method of claim 1, wherein the determining that the first managed user account should be in focus is in response to the mobile device establishing a connection with a network specified by the first set of managed policies.

5. The method of claim 4, further comprising:
   in response to determining that the mobile device no longer has the connection with the network specified by the first set of managed policies,
      moving the task for the unmanaged user account from the background context and to the foreground context for continued execution; and
      moving the task for the first managed user account from the foreground context and to the background context for continued execution.

6. The method of claim 1, further comprising:
   permitting execution of a particular task, of the plurality of tasks, for the unmanaged user account; and
   preventing execution of the particular task for the first managed user account based on the first set of managed policies.

7. The method of claim 6, wherein the particular task is a copy operation, a content-editing operation, an external communication operation, an internal communication operation, a request to access a camera of the mobile device, a request to access an external resource, or a request to activate a communication function.

8. The method of claim 1, wherein the partially managed application has a second managed user account that is managed according to a second set of managed policies, wherein the second managed user account is different from the first managed user account, and wherein the second set of managed policies is different from the first set of managed policies.

9. The method of claim 8, wherein the first set of managed policies is set by a first mobile application management provider and the second set of managed policies is set by a second mobile application management provider, wherein the second mobile application management provider is different from the first mobile application management provider.

10. A non-transitory storage medium storing machine-executable instructions that, when executed, cause a mobile device to:
    execute a multi-account managed application having a first managed user account and a second managed user account,
        wherein the multi-account managed application is configured to perform a first subset of a plurality of tasks for the first managed user account in a foreground context in accordance with a first set of managed policies, wherein the first set of managed policies specifies the first subset of the plurality of tasks, and
        wherein the multi-account managed application is configured to perform a second subset of the plurality of tasks for the second managed user account in a background context in accordance with a second set of managed policies, wherein the second set of managed policies specifies the second subset of the plurality of tasks;
    monitor state information of the mobile device;
    determine, based on a change in the state information of the mobile device, and based on the first set of managed policies; and the second set of managed policies, whether the first managed user account or the second managed user account should be in focus; and
    in response to a determination that the second managed user account should be in focus,
        move a task for the first managed user account from the foreground context and to the background context for continued execution; and
        move a task for the second managed user account from the background context and to the foreground context for continued execution.

11. The non-transitory storage medium of claim 10, wherein the determination that the second managed user account should be in focus is in response to the mobile device entering a geofence specified by the second set of managed policies.

12. The non-transitory storage medium of claim 10, wherein the determination that the second managed user account should be in focus is in response to the mobile device establishing a connection with a network specified by the second set of managed policies.

13. The non-transitory storage medium of claim 10, wherein the machine-executable instructions, when executed, further cause the mobile device to:
    permit execution of a particular task for the first managed user account based on the first set of managed policies; and
    prevent execution of the particular task for the second managed user account based on the second set of managed policies,
    wherein the particular task is part of the first subset but not part of the second subset.

14. The non-transitory storage medium of claim 13, wherein the particular task is a copy operation, a content-editing operation, an external communication operation, an internal communication operation, a request to access a camera of the mobile device, a request to access an external resource, or a request to activate a communication function.

15. The non-transitory storage medium of claim 10, wherein the multi-account managed application has an unmanaged user account.

16. An apparatus comprising:
    a processor; and
    a memory storing machine-executable instructions that, when executed by the processor, cause the apparatus to:
        execute a multi-account managed application having a first managed user account, a second managed user account, and an unmanaged user account;
            wherein the multi-account managed application is configured to perform a plurality of tasks for the unmanaged user account in a foreground context,
            wherein the multi-account managed application is configured to perform a first subset of the plurality of tasks for the first managed user account in a background context in accordance with a first set of managed policies, wherein the first set of managed policies specifies the first subset of the plurality of tasks, and
            wherein the multi-account managed application is configured to perform a second subset of the plurality of tasks for the second managed user account in the background context in accordance with a second set of managed policies, wherein the second set of managed policies specifies the second subset of the plurality of tasks;
        monitor state information of the apparatus;
        determine, based on a change in the state information of the apparatus, and based on the first set of managed policies; and the second set of managed policies, whether the unmanaged user account, the first managed user account, or the second managed user account should be in focus; and
        in response to a determination that the first managed user account should be in focus,
            move a task for the unmanaged user account from the foreground context and to the background context for continued execution; and
            move a task for the first managed user account from the background context and to the foreground context for continued execution.

17. The apparatus of claim 16, wherein the determination that the first managed user account should be in focus is in response to the apparatus entering a geofence specified by the first set of managed policies.

18. The apparatus of claim 16, wherein the determination that the first managed user account should be in focus is in response to the apparatus establishing a connection with a network specified by the first set of managed policies.

19. The apparatus of claim 16, wherein the machine-executable instructions, when executed, further cause the apparatus to:
    permit execution of a particular task, of the plurality of tasks, for the unmanaged user account;

permit execution of the particular task for the first managed user account based on the first set of managed policies; and prevent execution of the particular task for the second managed user account based on the second set of managed policies, wherein the particular task is part of the first subset but not part of the second subset.

20. The apparatus of claim 19, wherein the particular task is a copy operation, a content-editing operation, an external communication operation, an internal communication operation, a request to access a camera of the apparatus, a request to access an external resource, or a request to activate a communication function.

* * * * *